(12) United States Patent
Rouffet et al.

(10) Patent No.: US 7,864,660 B2
(45) Date of Patent: Jan. 4, 2011

(54) METHOD FOR TRANSPORTING A SIGNAL IN A RADIO NETWORK

(75) Inventors: Denis Rouffet, Boulogne-Billancourt (FR); Hang Nguyen, Clichy-la-Garenne (FR)

(73) Assignee: Alcatel Lucent, Paris (FR)

( * ) Notice: Subject to any disclaimer, the term of this patent is extended or adjusted under 35 U.S.C. 154(b) by 1007 days.

(21) Appl. No.: 11/446,263

(22) Filed: Jun. 5, 2006

(65) Prior Publication Data
US 2007/0008877 A1  Jan. 11, 2007

(30) Foreign Application Priority Data
Jul. 5, 2005  (EP) ................... 05291456

(51) Int. Cl.
*H04J 11/00* (2006.01)
*H04J 13/00* (2006.01)

(52) U.S. Cl. ........................ 370/208; 370/252

(58) Field of Classification Search ......... 370/203–210, 370/252, 348, 485; 455/561
See application file for complete search history.

(56) References Cited

U.S. PATENT DOCUMENTS

| | | | |
|---|---|---|---|
| 5,771,224 A * | 6/1998 | Seki et al. | 370/206 |
| 5,953,668 A | 9/1999 | Reilly et al. | |
| 6,693,952 B1 | 2/2004 | Chuah et al. | |
| 7,068,593 B2 * | 6/2006 | Cho et al. | 370/208 |
| 7,260,055 B2 * | 8/2007 | Wang et al. | 370/208 |
| 2003/0105894 A1 | 6/2003 | Gredone et al. | |
| 2005/0105482 A1 * | 5/2005 | Kobayashi et al. | 370/310.1 |
| 2005/0113041 A1 * | 5/2005 | Polley et al. | 455/105 |
| 2005/0249245 A1 * | 11/2005 | Hazani et al. | 370/485 |

FOREIGN PATENT DOCUMENTS

WO  03/107707  12/2003

OTHER PUBLICATIONS

EP Application No. 05291456.1, European Search Report, Jan. 18, 2006, 7 pages.

* cited by examiner

*Primary Examiner*—William Trost, IV
*Assistant Examiner*—Roberta A Shand
(74) *Attorney, Agent, or Firm*—Fay Sharpe LLP

(57) ABSTRACT

For ensuring a low cost transport of signals in a radio network, in particular with a high density of radio access points, a method is proposed, where the signals are transported over wires between a base station and radio access points, comprising the steps of:
- determining the useful band of each wire (20);
- associating at least two wires (21);
- filtering the signal into sub-bands (22);
- transporting each sub-band over one or more wires of the associated wires (25);
- at the receiving end rebuilding the signal from the sub-bands (27).

Further proposed are a radio head and a radio controller both adapted to the present method.

19 Claims, 4 Drawing Sheets

METHOD FOR TRANSPORTING A SIGNAL IN A RADIO NETWORK

TECHNICAL FIELD

The invention is based on a priority application EP 05291456.1 which is hereby incorporated by reference.

The present invention relates to a method for transporting a signal in a radio network, wherein the signal is transported over wires between a radio head and a radio controller. The present invention further relates to a radio head and a radio controller.

BACKGROUND OF THE INVENTION

In the context of the development of broadband mobile infrastructure, in particular 4G (fourth generation) networks and high data rate radio enterprise networks, the installation of pico cell gets more and more important. A pico cell is a part of a cellular network providing a high bit rate and having a typical radius of 50-100 m. Per square kilometer, up to several hundreds of radio access point can be installed. This leads to the first concentration layer, i.e. the first or physical layer at a node of the network to require a high number of links.

On the one hand, the usage of leased lines as in 2G (second generation) or 3G (third generation) networks is expensive, especially if the bit rate per access point is high. On the other hand, the revenue per user will almost be constant in 4G networks, as compared to 2G/3G networks. Thus, the part of revenue dedicated to transport should not significantly increase.

The transport solutions providing high data rate in place are ATM (asynchronous transport mode), SDH (synchronous digital hierarchy), Ethernet etc. But currently, transport is usually not optimized in the design of radio access networks. Normally, a specific protocol is installed with the transport equipment. In case of pico cells, this approach makes it necessary to install a protocol based transport inside the radio access points. Such a radio access point is quite complex, having physical and MAC layers as well as management layers and the transport protocol. For examples, such radio access points have been implemented in WiFi solutions, where "light" and "heavy" radio access points exist according to the radio management capabilities. The transport solution in this specific case is Ethernet.

The outlined approach is quite complex and in consequence quite costly. It is therefore an object of the present invention to provide a transport method with reduced complexity.

SUMMARY OF THE INVENTION

This object is achieved by a method for transporting a signal in a radio network between a radio head and a radio controller, wherein the signal is transported over wires, said method comprising the steps of:
  determining the useful band of each wire;
  associating at least two wires;
  filtering the signal into sub-bands;
  transporting each sub-band over one or more wires of the associated wires;
  at the receiving end rebuilding the signal from the sub-bands.

The present method permits to concentrate almost all complexities at the radio controller side of the connection, thus avoiding a large and costly overhead of higher layers of a protocol on the radio head side. A major advantage is that the signal does not need to be demodulated for transport between radio head and radio controller. Any demodulating or modulating is done only by central points of the radio network such as radio controllers, but not by radio heads. The present method reduces the signal transport between radio head and radio controller to a transparent transmission without high level processing of the signal.

Furthermore, the present method makes use of wires. Wires are almost ubiquitous, inexpensive, reliable, easily adaptive and are utilized in function of the bandwidth they actually provide. In particular, already existing wiring can be used. By processing the signal to be transported only for the transport and then restoring it, it is possible to make the transport transparent to the air interface of the radio network by choosing an appropriate signal type. Filtering the signal into sub-bands for transport over the wires permits to transport even complex signals with minimal operative expenditure.

It will be noticed that the determining of the useful bands of each wire can be done in a static way, for example when installing the network with normal wires as used for conventional telephony, or also dynamically, e.g. periodically every some minutes. Particularly when using large bandwidth wires as for high data rate telecommunication, e.g. for ADSL (asymmetric digital subscriber line), it is preferred to determine the useful bands and eventually also associate the wires in groups of at least two wires dynamically, for example every time a signal or a definite group of signals is sent or a new communication is set up. How many wires are associated or grouped depends on the needed capacity, e.g. the number and width of the sub-bands.

The filtering into sub-bands is done in the frequency domain, and in particular Fourier-type transformation schemes are preferred. Segmenting the signal into sub-bands and processing and transporting the sub-bands minimizes the risk of signal degradation of any kind due to the overall transport process, in particular due to linear impairments.

In preferred embodiments, the method comprises the steps of:
  creating a direct and an associated inverse spectrum of each sub-band;
  transporting the direct spectra over some of the associated wires and their associated inverse spectra over the other wires of the associated wires;
  at the receiving side recombining each direct spectrum and its associated inverse spectrum.

This is particularly advantageous in case of for example outdoor, poor quality wiring, because it permits to simplify the equalization in case of a difficult channel with e.g. non-linear noise or impulsive noise.

In other preferred embodiments, only a direct spectrum is created. This is less complex proceeding is preferred for example when using indoor wiring, where less noise or other disturbances are to be expected.

Preferably, calibration and equalization are done digitally in case of weak distortion and attenuation, or with help of digital as well as analog tools in case of heavy distortion and attenuation. It has shown to be advantageous to equalize after recombining to palliate for low pass attenuation or dispersive attenuation that may be caused by the transport over wires. It has further shown to be advantageous to calibrate and/or fine equalize after rebuilding. Calibration reduces loss of information due to noise and fine equalization reduces loss of information due to attenuation during the transport. Fine equalization is preferably done sub-band by sub-band.

In case multiplexed signals are to be transported, they should preferably be demultiplexed before further processing and transport.

Any frequency-multiplexed signal is advantageously transported by the present method. In preferred embodiments of the present invention, OFDM (Orthogonal Frequency Division Multiplexing) signals are transported. OFDM is expected to be the modulation used as standard in 4G networks.

Preferably, the signals are transported over copper wires. Copper wires are particularly inexpensive, as large networks of copper wires already exist. Copper wires are very well adapted for the transport of signals and can offer bandwidths of around one to several MHz, depending on the distance and the wire condition. For example, using indoor CAT5 cables allows for a range of typically up to 200 m. In case of outdoor pico cells even up to 1000 m may be attained.

The method according to the present invention is especially well suited for transporting signals in a cellular network, in particular a cellular network with pico cells.

In a further aspect, the present invention relates to a radio controller for transporting a signal in a radio network over wires to and from a radio head, the radio controller comprising:
  means for determining the useful band of each wire;
  means for associating at least two wires.
  means for filtering signals into sub-bands;
  means for rebuilding signals from sub-bands.

In a last aspect, the present invention relates to a radio head for transporting a signal in a radio network over wires to and from a radio controller, the radio head comprising:
  interface means to an antenna;
  means for filtering signals into sub-bands;
  means for rebuilding signals from sub-bands.

The radio heads provide only the infrastructure for actually transporting signals, corresponding basically to the PHY layer of a protocol. Further means for implementing higher layers are needed only on the side of the radio controller. This significantly simplifies the design and the equipment of the radio head compared to a radio access point as commonly used, thus minimizing the cost of a radio network transporting signals over wires according to the present invention. Only the means as mentioned above are necessary for transporting any complex radio signal over wires without much operating expenditure.

In preferred embodiments of the radio head or the radio controller, they further comprise signal shaping means and/or demultiplexing/multiplexing means and/or analog-digital/digital-analog conversion means and/or inversion/re-inversion means.

BRIEF DESCRIPTION OF THE DRAWINGS

A detailed description of the invention is provided below. Said description is provided by way of a non-limiting example to be read with reference to the attached drawings in which.

DETAILED DESCRIPTION OF PREFERRED EMBODIMENTS

Figure 1:
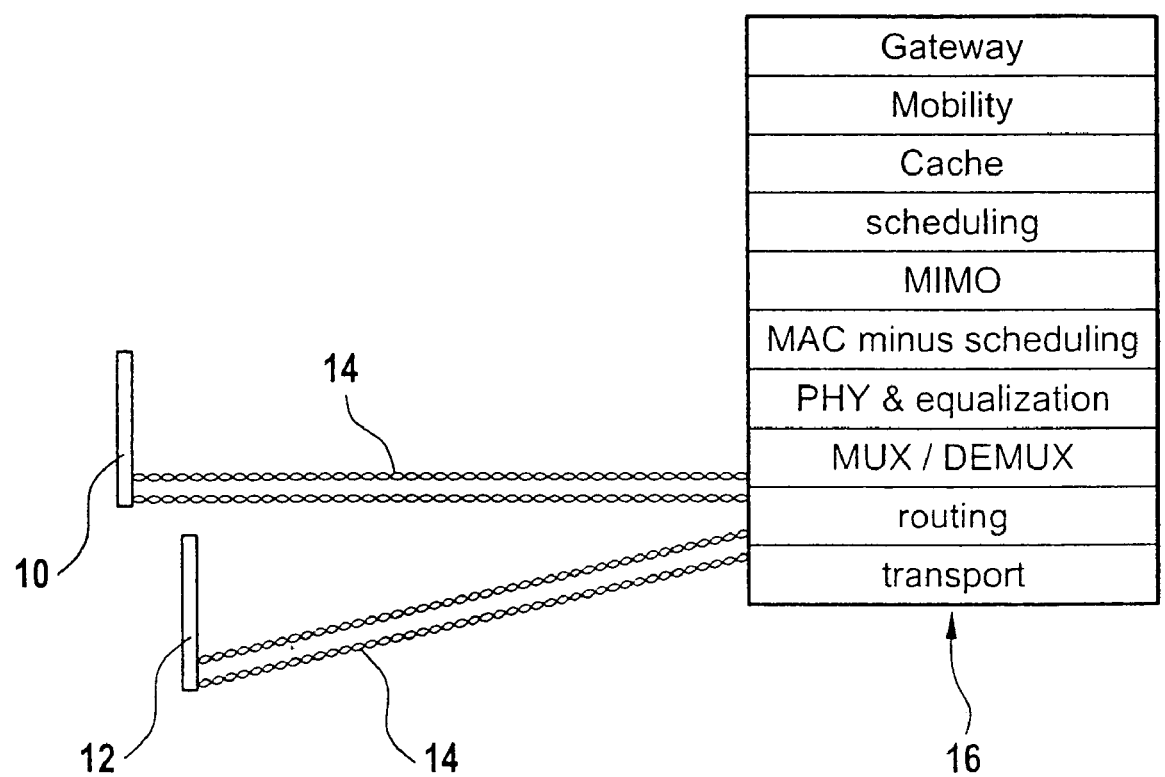
FIG. 1 shows schematically the basic concept of the present invention in view of affected layers.

The present invention will be explained more in detail with respect to a cellular network with pico cell coverage. This 4G network uses OFDM signals for transmission. Other advantageous applications are for example high data rate enterprise indoor networks, where e.g. existing Ethernet wiring like CAT5 cables can be utilized. Another example would be to replace a coaxial cable in a cellular network between the antenna on the roof of a building and the processing entity in the basement of the building with twisted cables. The present invention is particularly useful for a targeted spectrum of 20 MHz to 100 MHz FIG. 1 shows schematically the basic concept of the present invention in view of affected layers of a base station controller 16 acting as a radio controller. The base station controller 16 is connected to base transceiver stations 10, 12 by pairs of copper wires 14 to inexpensively transport signals with a very high bit rate to the base transceiver stations 10, 12 acting as radio heads.

As illustrated in FIG. 1, all higher layer functions are concentrated in a single equipment, here the base station controller 16. Especially high level processing like modulation and demodulation is done only by the base station controller 16 and not by the by the transceiver stations 10, 12. Only the radio functions—in the present example transparent and analogous—are remote and located in the base transceiver stations 10, 12, thus significantly reducing the complexity and cost of the base transceiver stations.

The layers describing the functions of the base station controller 16 or a network node in general are sorted by a hierarchy going from lower functions realized as hardware to more abstract functions concerning the actual applications and usually realized as software. General transport and routing of signals as well as multiplexing and demultiplexing are achieved by circuitry on the hardware level. The physical layer PHY is in charge of modulation and equalization. The media access control layer MAC and the multiple input multiple output layer MIMO are in charge of transport on a more abstract level as they manage the addresses, where to send signals (MAC), and how to conveniently regroup and process signals (MIMO). The scheduling layer is in charge of packetizing and the cache layer provides storage for the actual application, in case it is necessary for delivery, e.g. for real time services. The mobility and the gateway layer are entirely related to the actual application.

In opposite to the conventional approaches for transporting signals, where the focus is on the upper layers, i.e. MAC and higher, by adding transport protocol and management layers, the present invention makes use of the possibilities provided by the lowest layers, in particular the transport, routing and multiplexing and demultiplexing layer. In some embodiments of the present invention, the PHY layer is implicated, too. This allows for efficiently utilizing wires for inexpensively transporting signals with high data rate between nodes of a network, in the present example between a base station controller 16 and base transceiver stations 10, 12, and for reducing as much as possible the complexity of the respective nodes in view of necessary layers.

It will be noted that in real networks not only two base transceiver stations 10, 12 are connected to a base station controller, but up to several hundreds, increasing considerably the potential of the method according to the present invention to reduce transport cost.

Figure 2:
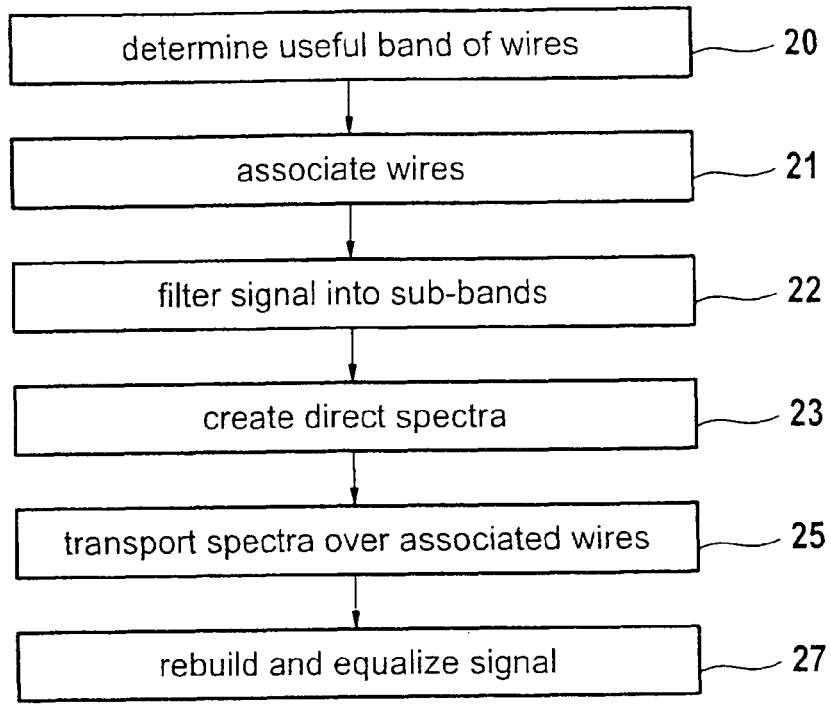
FIG. 2 is a general flowchart of a first embodiment of the method according to the present invention.

FIG. 2 is a general flowchart of a first embodiment of the method according to the present invention. It is to be used in an indoor enterprise pico cell network making use of already existing CAT5 cabling for Ethernet.

In a first step 20, the wires, preferably copper wires, are probed to determine the useful band they can provide. If this is done statically, the further process is based on the minimum band they can provide. If this is done dynamically, the actual band is made use of. Depending on the result of the band determination, the wires are associated in groups (step 21). Preferably, wires providing approximately the same bandwidth are associated to make best use of the available resources as the narrowest band of the associated wires is determining the usable band of the associated wires.

The signal is filtered into sub-bands (step 22), because the smaller the units to be transported are, the lower is the probability of information loss due to transport. This permits to transport even quite complex signals or signals carrying several bits of information without high expenditure. To prepare the sub-bands for transport, direct spectra are created (step 24), e.g. by using Discrete Fourier Transform (DFT). It is possible as well to create a direct spectrum of the signal and then split the signal's spectrum into sub-bands in order to transport the signal. The direct spectra are transported over the associated wires (step 25) and then the signal is rebuilt from the signal sub-bands (step 27) and equalized.

Figure 3:
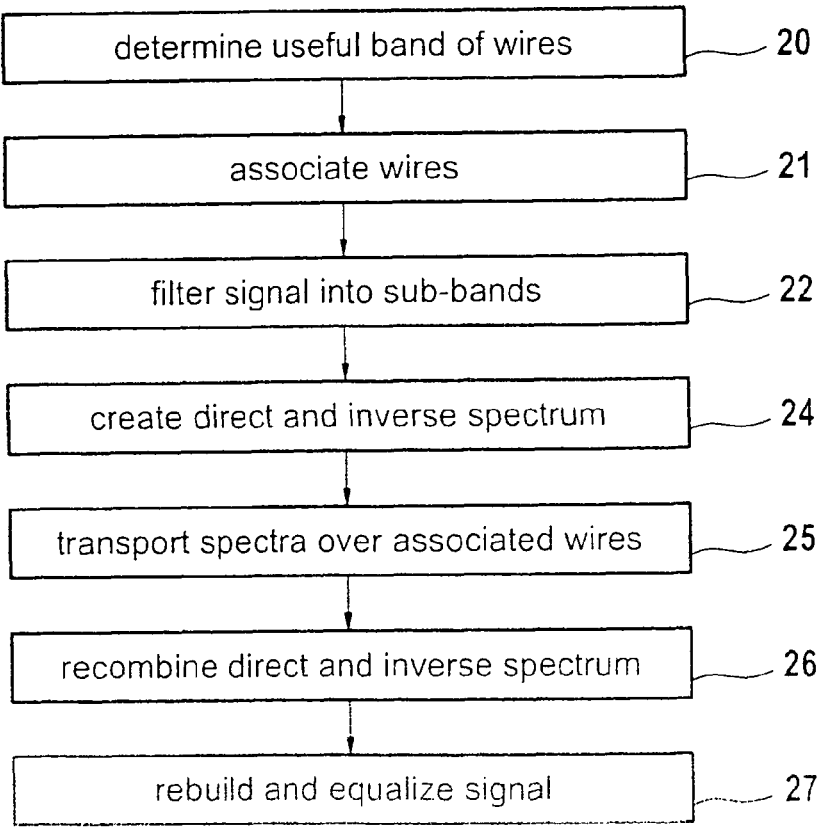
FIG. 3 is a general flow chart of the second preferred embodiment.

FIG. 3 is a flowchart of a second preferred embodiment of the method according to the present invention optimized for outdoor pico cells or pico cells with bad quality wiring. This embodiment is also further illustrated in FIG. 4. Because of the worse transport conditions, the sub-bands are duplicated and inverse spectra are also created (step 24).

The direct and the respective inverse spectra of signal the sub-bands are transported over the associated wires in that the direct spectra are transported over some of the associated wires and the respective inverse spectra are transported over the other wires (step 25). At the reception point, e.g. a base transceiver station, the direct and its respective inverse spectrum are added and thus each sub-band is restored (step 26), before rebuilding and equalizing the signal from the sub-bands (step 27). It will be noted, that providing sub-bands of the signal simplifies equalization in view of reducing the impact of linear impairments, whereas providing inverse spectra simplifies the equalization in view of reducing the impact of non-linear impairments.

Figure 4:
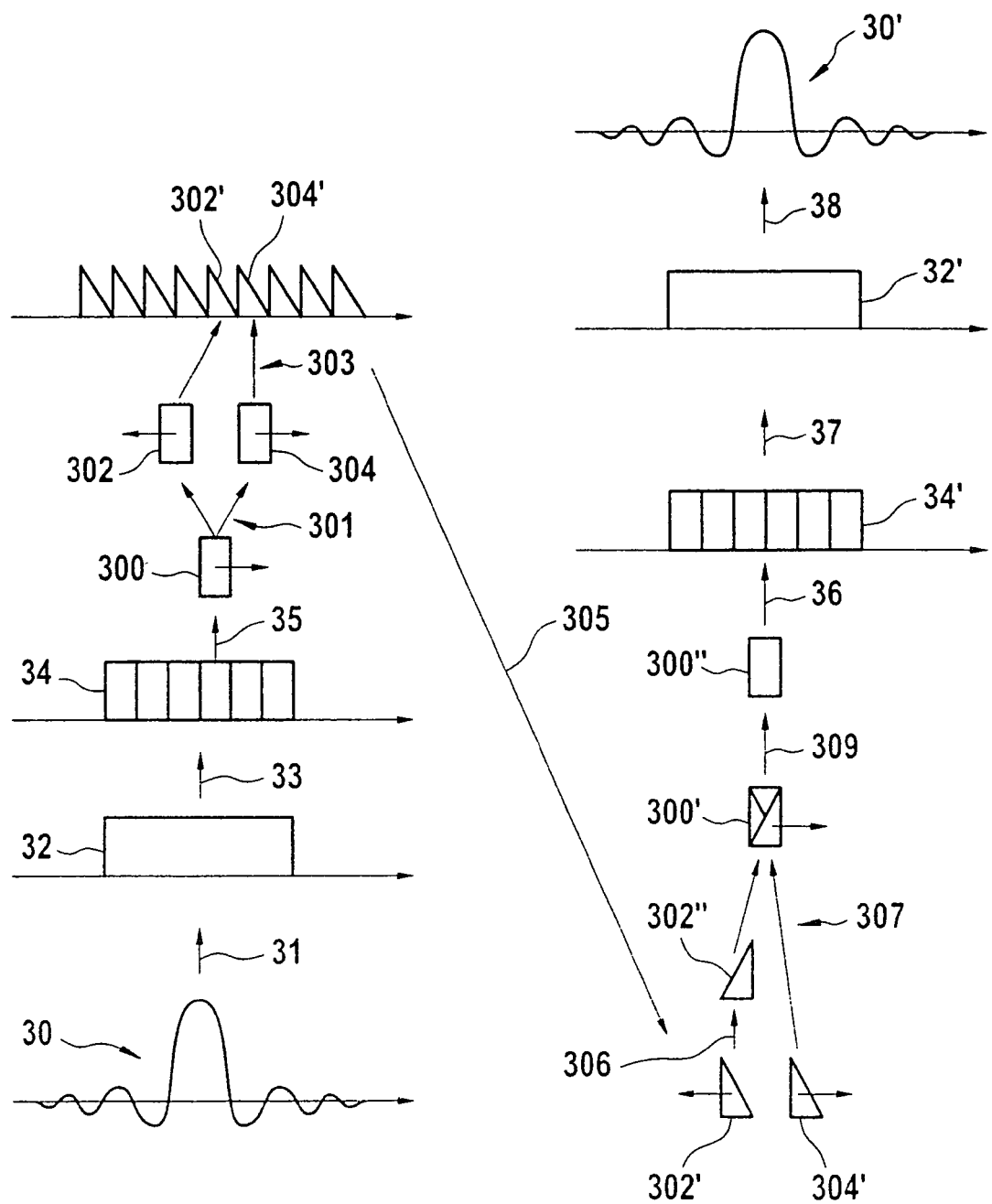
FIG. 4 illustrates exemplarily the processing of a signal for transport according to the second embodiment of the present method.

FIG. 4 illustrates exemplarily more in detail the processing of a signal for transport according to the present method. An analogue signal 30 is "adapted" for use in a 4G pico cell network by e.g. Fourier-transforming it and multiplexing it (step 31) into a OFDM signal 32. To prepare this OFDM signal 32 for transport from e.g. a base station controller to a base transceiver station, the spectrum is filtered in order to assign a number of OFDM sub-carrier to sub-bands 300 of the OFDM signal 32. This filtering has the function of demultiplexing and splitting of the OFDM signal 32 into sub-band spectra 300.

Each sub-band 300 is transposed or frequency-shifted, e.g. to 0 and then filtered to duplicate each sub-band 300 and inverse the spectrum of one of each pair of double sub-bands (step 301), resulting in a direct sub-band spectrum 304 and its associated inverse sub-band spectrum 302.

These pairs of direct and associated sub-band spectra 302, 304 are input to a pair of copper wires for transport (step 303). This changes their shapes to pairs of direct and associated sub-band spectra 302', 304'. After transport and reception (step 305), the inverse sub-band spectrum 302' is re-inverted into a direct sub-band spectrum 302" (step 306). Then the re-inverted sub-band spectrum 302" is associated to its direct sub-band spectrum 304' and both are recombined, i.e. synchronized and added together (step 307). The result 300' is equalized (step 309), especially to compensate for group delay and changes in amplitude, e.g. due to selective low pass or dispersive attenuation during transport over the wires or due to different frequency shifts resulting in different destructive and constructive interferences.

Having recombined all pairs of direct and inverse sub-band spectra 302', 304' to single sub-band spectra 300', these are utilized for rebuilding the original OFDM spectrum with sub-bands 34'. This is then translated and multiplexed. Besides it is calibrated from time to time to compensate the influence of variation e.g. of temperature, and fine equalized, i.e. equalized sub-band per sub-band (step 37). The result is the original OFDM spectrum 32'. Finally, the OFDM signal 32' is transmitted to further processing, for example inverse Fourier-transformation resulting in the original signal 30'. If the signal has been transported to a radio head, it is further sent over the air interface of the radio network.

Figure 5:
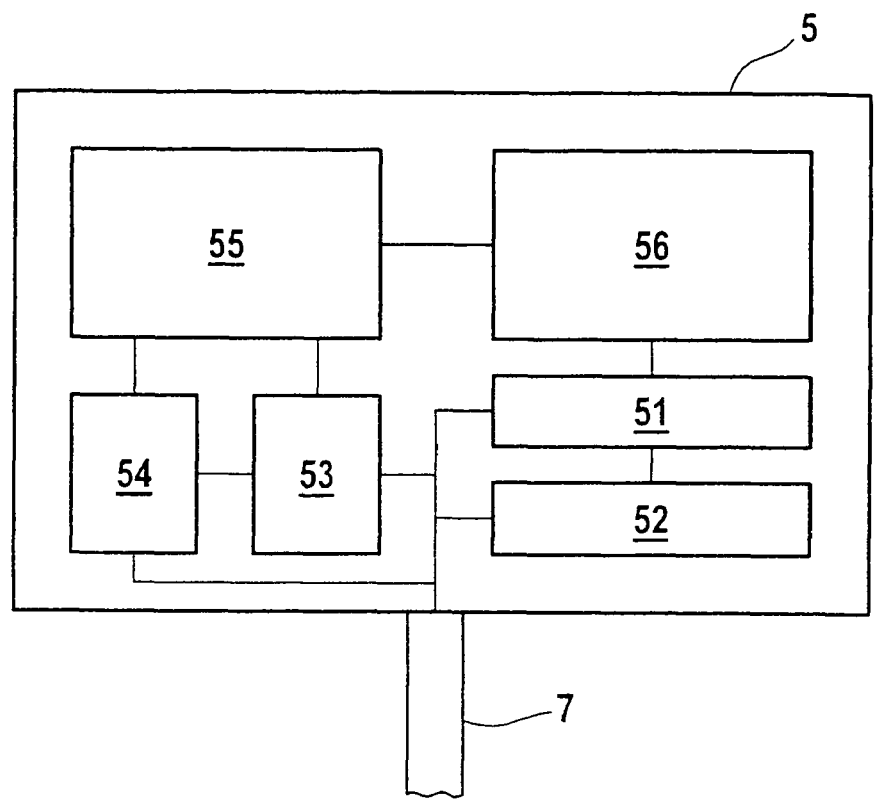
FIG. 5 shows schematically an embodiment of a radio controller according to the present invention.

FIG. 5 shows a schematic view of an embodiment of a radio controller 5 that is relied by cabling 7 containing wires with one or more radio heads. The useful band of each wire in cabling 7 is determined by band determiner 51 before the wire associator 52 groups them depending on the signal to be transported, the transport distance and/or the transport conditions, e.g. indoor or outdoor wiring or kind of wire shielding.

The sub-band filter 53 splits the signal into sub-bands, whereas the signal rebuilder 54 rebuilds a signal from incoming sub-bands. Filter 53 and rebuilder 54 may also be implemented as one electronic component operating in both directions, splitting and rebuilding.

If necessary, the signal or sub-bands are further processed by processing means 55, such as multiplexing and/or demultiplexing, analog-digital and/or digital-analog conversion or signal shaping such as duplication, inversion, amplification, equalization, calibration, Fourier-type transformation etc. MAC layers, control and management of the transport, and all classical upper layer functions are implemented in tool 56.

Figure 6:
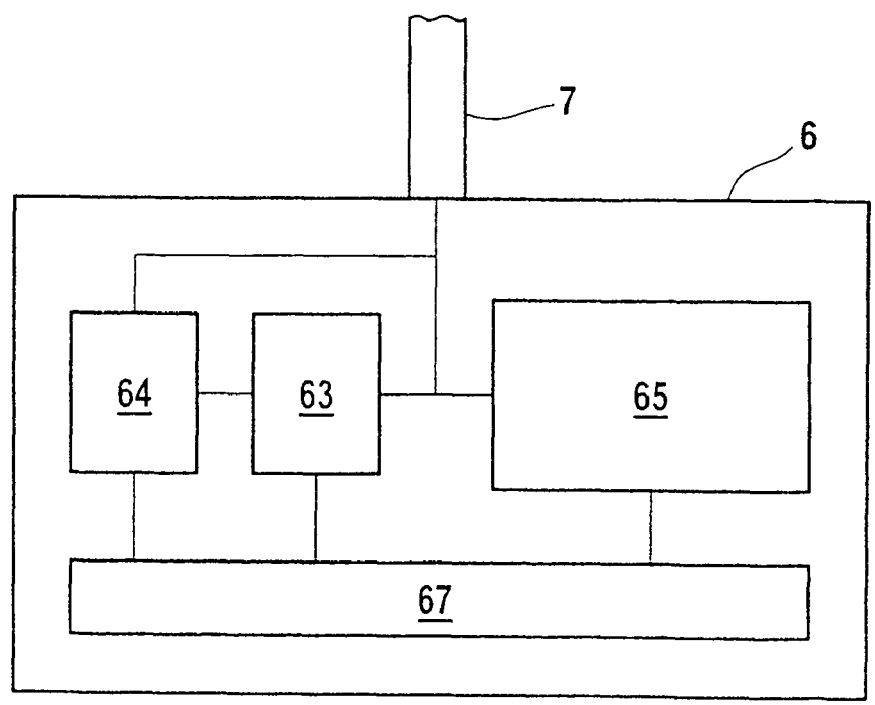
FIG. 6 shows schematically an embodiment of a radio head according to the present invention.

FIG. 6 shows a schematic of a radio head 6, relied to a radio controller by cabling 7 containing wires. It includes a sub-band filter 63 and a signal rebuilder 64, like in the radio controller of FIG. 5, as well as processing means 65 for multiplexing/demultiplexing, analog-digital/digital-analog conversion, signal shaping, such as amplification, calibration, equalization, filtering, duplication, inversion, Fourier-type transformation etc.

The signal is either received from an antenna via antenna interface 67 to be transported to the radio controller, or received from the radio controller to be sent over the antenna via antenna interface 67.

The present example of a radio head 6 is for a radio network with mostly downstream traffic, where the necessary band determination and wire association is done only from time to time and by the radio controller. In other radio networks, it might be necessary to implement these functions also in the radio heads.

Although having described several preferred embodiments of the invention, those skilled in the art would appreciate that various changes, alterations, and substitutions can be made without departing from the spirit and concepts of the present invention. The invention is, therefore, claimed in any of its forms or modifications with the proper scope of the appended claims. For example various combinations of the features of the following dependent claims could be made with the features of the independent claim without departing from the scope of the present invention. Furthermore, any reference numerals in the claims shall not be construed as limiting scope.

LIST OF REFERENCE NUMBERS 10 base transceiver station
12 base station controller
14 pair of copper wires
16 layer stack
20-27 steps
30, 30' signal
31 Fourier transformation
32, 32' OFDM spectrum
33 demultiplexing
34, 34' OFDM spectrum with sub-bands
35 filtering and shifting
36 rebuilding
37 calibration and fine equalization
38 inverse Fourier transformation
300, 300' sub-band spectrum
301 duplicating and inverting
302, 302', 302" inverse sub-band spectrum
303 inputting
304, 304' direct sub-band spectrum
305 outputting
306 inverting
307 recombining
309 equalizing
5 radio controller
51 band determiner
52 wire associator
53 sub-band filter
54 signal rebuilder
55 processing means
56 tool
6 radio head
63 sub-band filter
64 signal rebuilder
65 signal processing means
67 antenna interface
7 cabling

The invention claimed is:

1. A method for transporting an Orthogonal Frequency Division Multiplexing signal in a radio network, wherein the signal is transported over wires between a radio head and a radio controller, said method comprising the steps of:
    determining a useful band of each wire;
    associating at least two wires in a group based at least in part on the Orthogonal Frequency Division Multiplexing signal to be transported, known transport conditions, and the useful bands resulting from the determining;
    filtering the Orthogonal Frequency Division Multiplexing signal into sub-bands;
    creating a direct spectrum and an associated inverse spectrum of each sub-band;
    transporting the direct spectrum and corresponding inverse spectrum for each sub-band from a sending network device to a receiving network device over the group of associated wires, wherein the direct spectra are transported over a first portion of the group of associated wires and the inverse spectra are transported over a second portion of the group of associated wires;
    at the receiving network device, recombining each direct spectrum and the associated inverse spectrum for each sub-band; and
    rebuilding the Orthogonal Frequency Division Multiplexing signal from the sub-bands resulting from the recombining.

2. The method according to claim 1, comprising the further step of equalizing each sub-band resulting from the recombining.

3. The method according to claim 1, comprising the further step of demultiplexing the Orthogonal Frequency Division Multiplexing signal before the filtering into sub-bands.

4. The method according to claim 1, wherein the spectra are transported over copper wires.

5. A radio controller for transporting a signal in a radio network over wires to and from a radio head, the radio controller comprising:
    means for determining a useful band of each wire;
    means for associating at least two wires in a group based at least in part on the signal to be transported, known transport conditions, and the useful bands resulting from the determining;
    means for filtering signals into sub-bands for transport to the radio head;
    signal shaping means for duplication, inversion and Fourier-type transformation of filtered sub-bands to be transported to the radio head; and
    means for rebuilding signals from filtered sub-bands received from the radio head.

6. The radio controller according to claim 5, wherein the signal to be transported is multiplexed, the radio controller further comprising demultiplexing means for demultiplexing the signal prior to the filtering into sub-bands.

7. A radio head for transporting a signal in a radio network over wires to and from a radio controller, the radio head comprising:
    means for determining a useful band of each wire;
    means for filtering signals into sub-bands for transport to the radio controller;
    signal shaping means for duplication, inversion and Fourier-type transformation of filtered sub-bands to be transported to the radio controller;
    means for rebuilding signals from filtered sub-bands received from the radio controller; and
    means for associating at least two wires in a group based at least in part on the signal to be transported, known transport conditions, and the useful bands resulting from the determining.

8. The radio head according to claim 7, wherein the signal to be transported is multiplexed, the radio head further comprising demultiplexing means for demultiplexing the signal prior to the filtering into sub-bands.

9. The method according to claim 1 wherein the sending network device is the radio controller and the receiving network device is the radio head.

10. The method according to claim 1, comprising the further step of fine equalizing the Orthogonal Frequency Division Multiplexing signal resulting from the rebuilding.

11. The method according to claim 1, comprising the further step of fine calibrating the Orthogonal Frequency Division Multiplexing signal resulting from the rebuilding.

12. The radio controller according to claim 5, further comprising multiplexing means.

13. The radio controller according to claim 5, further comprising analog-digital conversion means.

14. The radio controller according to claim 5, further comprising digital-analog conversion means.

15. The radio controller according to claim 5 wherein the signal shaping means is also for amplification, equalization, and calibration of signals resulting from the rebuilding of filtered sub-bands received from the radio head.

16. The radio head according to claim 7, further comprising multiplexing means.

17. The radio head according to claim 7, further comprising analog-digital conversion means.

18. The radio head according to claim 7, further comprising digital-analog conversion means.

19. The radio head according to claim 7 wherein the signal shaping means is also for amplification, equalization, and calibration of signals resulting from the rebuilding of filtered sub-bands received from the radio controller.

* * * * *